(12) United States Patent
Hassan et al.

(10) Patent No.: US 6,301,231 B1
(45) Date of Patent: Oct. 9, 2001

(54) SATELLITE COMMUNICATION SYSTEM WITH VARIABLE RATE SATELLITE LINK DIVERSITY

(76) Inventors: Amer A. Hassan, 12623 NE. 107$^{th}$ Pl., Kirkland, WA (US) 98033; Mark E. Lundstrom, 1212 E. Shelby, Boat 2, Seattle, WA (US) 98102; John A. Zukoski, 23142 SE. 27$^{th}$ Way, Issaquah, WA (US) 98029

( * ) Notice: Subject to any disclaimer, the term of this patent is extended or adjusted under 35 U.S.C. 154(b) by 0 days.

(21) Appl. No.: 09/089,192

(22) Filed: Jun. 2, 1998

(51) Int. Cl.$^7$ .............................. H04B 7/185; H04B 7/212
(52) U.S. Cl. .................. 370/316; 370/349; 370/474; 342/352; 455/13.1; 714/776
(58) Field of Search .................. 370/313, 314, 370/316, 319, 320, 321, 326, 329, 349, 389, 471, 474; 342/352, 353, 356; 455/11.1, 12.1, 13.1, 15, 16; 714/746, 752, 774, 776

(56) References Cited

U.S. PATENT DOCUMENTS

| | | | |
|---|---|---|---|
| 4,074,230 | * | 2/1978 | Icenbice, Jr. ............... 340/146.1 BE |
| 4,135,156 | | 1/1979 | Sanders, Jr. et al. .................. 455/12 |
| 4,928,274 | * | 5/1990 | Gilhousen et al. ..................... 370/92 |
| 5,303,297 | | 4/1994 | Hillis ...................................... 379/63 |
| 5,390,166 | | 2/1995 | Rohani et al. ......................... 370/18 |
| 5,532,939 | | 7/1996 | Psinakis et al. ................. 364/514 C |
| 5,541,963 | | 7/1996 | Nakagoshi ............................ 375/347 |
| 5,546,397 | | 8/1996 | Mahany .............................. 370/85.1 |
| 5,553,131 | | 9/1996 | Minervino, Jr. et al. ............ 379/221 |
| 5,559,838 | | 9/1996 | Nakagoshi ........................... 375/347 |
| 5,592,481 | * | 1/1997 | Wiedeman et al. .................. 370/316 |
| 5,777,990 | * | 7/1998 | Zehavi et al. ........................ 370/335 |
| 5,812,538 | * | 9/1998 | Wiedeman et al. .................. 370/316 |
| 5,841,766 | * | 11/1998 | Dent et al. ............................ 370/321 |
| 6,208,859 | | 3/2001 | Halvorson ............................ 455/430 |

FOREIGN PATENT DOCUMENTS

WO 96/29823    9/1996    (WO).
WO 96/29824    9/1996    (WO).

* cited by examiner

*Primary Examiner*—Alpus H. Hsu
(74) *Attorney, Agent, or Firm*—Michael J. Donohue; Seed IP Law Group PLLC

(57) ABSTRACT

A satellite communication system includes Earth-based terminal and a satellite constellation in non-geosynchronous Earth orbits. When two or more satellites are within range of a first Earth-based terminal, the station requests a communication link with the first satellite at a first data rate. If the first satellite will accept data transfer at the first communication rate, the first Earth-based terminal transmits data to the first satellite at the requested first data rate. If, however, the first satellite will not accept data transfer at the requested first data rate, the first Earth-based terminal transmits a first portion of the data to the first satellite at a second data rate and transmits a second portion of the data, different from the first portion of the data, to the second satellite at a third data rate. The first and second satellites relay the respective data portions to a second Earth-based terminal, either directly or via additional satellites. The second Earth-based terminal reassembles the first and second data portions to recover the original data. The data transfer may be unequal error correction encoded data whereby the second Earth-based terminal may recover the original data from only a portion of the received error correction encoded data.

21 Claims, 9 Drawing Sheets

SATELLITE COMMUNICATION SYSTEM WITH VARIABLE RATE SATELLITE LINK DIVERSITY

TECHNICAL FIELD

The present invention is related generally to telecommunications systems and, in particular, to satellite communications with satellite link diversity.

BACKGROUND OF THE INVENTION

Geosynchronous satellites are relied upon as part of larger communication networks by businesses, universities and individuals to provide a wide variety of communication services. Because a single satellite in geosynchronous orbit may transmit to a large portion of the Earth's surface, satellites are ideal for providing communication services to remote or thinly populated areas where cabling (e.g., land line, fiber optics, etc.) would not be economically feasible, or where rights-of-way would not easily be established. Satellites therefore allow advanced communication services to be made available around the world. For example, satellite systems are well suited for providing geographically distributed media services, such as video broadcasting.

Recently, it has been proposed to use a constellation of low-Earth orbit (LEO) satellites to provide telecommunications services to the entire world. In a LEO system, signals are transmitted from a first Earth-based terminal to a satellite on an up-link, routed through the constellation, and then transmitted from the satellite to a second Earth-based terminal on a down-link. The satellites therefore act as nodes in a network through which the signals are routed. The information carried in the signals may be generically referred to herein as "data," and may include audio, video, or other types of data.

Many LEO systems have proposed routing data through the constellation in the form of "data packets." At the first Earth-based terminal, the data to be transmitted is divided into multiple data packets that are routed through the satellite constellation and then reassembled at the destination Earth-based terminal to reconstitute the original data. In systems that packetize data for transmission, each data packet may take an independent route through the constellation from the source Earth-based terminal to the destination Earth-based terminal. If network traffic is light, data packets are quickly routed through the communication system. Sometimes, however, the satellite communication network may become congested due to equipment failures or particularly heavy data packet traffic, for example. Congestion could slow delivery of data packet traffic, and impact the timeliness of traffic required for near real-time applications, such as videoconferencing. It can be appreciated, therefore, that there is a significant need for techniques that reduce congestion within a LEO satellite communication system. The present invention provides this and other advantages as will be illustrated by the following description and accompanying figures.

SUMMARY OF THE INVENTION

The present invention is directed to a constellation-based satellite communication system and, in an exemplary embodiment, provides a technique for transmitting data from a first Earth-based terminal to a first and second satellite in non-geosynchronous Earth orbits. The first Earth-based terminal includes an antenna system to communicate with the first and second satellites and a transmitter coupled to the antenna to transmit to the first and second satellites. The transmitter transmits a request for a communication link with the first satellite at a first data rate. A receiver in the first Earth-based terminal is coupled to the antenna system to receive from the first and second satellites. The receiver receives a reply from the first satellite in response to the request for a communication link. If the reply indicates that a communication link is available at the first data rate, a connection is established and transmission initiated. If, however, the reply indicates that the first data rate is not available and only a second data rate (less than the first data rate) is available, then a request for a communication link is transmitted to the second satellite. If a reply from the second satellite indicates that a communication link is available, then a communication link is established with both the first and second satellites.

The system also includes a communication controller which, in response to the reply from the first satellite, apportions the data into first and second data portions. The transmitter establishes a first communication link with the first satellite to transmit the first data portion to the first satellite at the second data rate and, while maintaining the first communication link, establishes a second communication link with the second satellite to transmit the second data portion to the second satellite at a third data rate (which, when summed with the second data rate equals the first data rate).

The first satellite typically has a current maximum data rate. In some instances, the current maximum data rate is less than the first data rate. In this case, the transmitter transmits at the second data rate, wherein the second data rate is less than the current maximum data rate. In other instances, the current maximum data rate is greater than the first data rate. In that case, the transmitter transmits at the second data rate, wherein the second data rate is less than the current maximum data rate by a predetermined amount.

The system may also include a second Earth-based terminal designated as a recipient of the data transmitted from the first Earth-based terminal. Because the first and second data portions are independently routed through the satellite constellation, the portions may arrive at the second Earth-based terminal at different times and in a different order than initially sent. The second Earth-based terminal therefore includes a communication controller to process the first and second data portions and recover the data in the order that it was sent.

In an exemplary embodiment, the system also includes an error correction encoder in the first Earth-based terminal to process the data and thereby generate encoded data. In this embodiment, the first and second data portions comprise encoded data. The second Earth-based terminal includes an error correction decoder to process at least a portion of the first and second encoded data portions and thereby recover the data.

The system may further include a third satellite in Earth orbit wherein the communication controller apportions the data into first, second and third different data portions and the transmitter, while maintaining the first and second communication links, establishes a third communication link with the third satellite to transmit the third data portion to the third satellite at a fourth data rate less than the first data rate.

In yet another embodiment, the system may further comprise a relay satellite in Earth orbit to receive data portions sent to different satellites. The relay satellite can process the received data portions and thereby recover the data. In this embodiment, the relay satellite either directly transmits the recovered data to the second Earth-based terminal or forwards the recovered data through the satellite constellation for delivery to the second Earth-based terminal.

DETAILED DESCRIPTION OF THE INVENTION

The present invention may be embodied in a communication system designed to transmit data from a first Earth-based terminal up to a constellation of satellites in non-geosynchronous orbit and down to a second Earth-based terminal. When the first Earth-based terminal is in view of at least two satellites in the constellation, the data may be split and a portion of the data transmitted to each of the satellites in view. For example, suppose that an Earth-based terminal requests to transmit data $\{d_1, d_2, d_3, d_4, d_5, d_6 \ldots d_n\}$ at a data rate equal to R bits/second. According to the present invention, the Earth-based terminal transmits one portion of the data, for example, $\{d_1, d_2, d_3\}$ at $R_1$ bits/second to one satellite and transmits another portion the data $\{d_4, d_5, d_6 \ldots d_n\}$ at $R_2$ bits/second to the other satellite, where the sum of $R_1$ bits/second plus $R_2$ bits/second equal R bits/second, and where the data portion $\{d_1, d_2, d_3\}$ is different from the data portion $\{d_4, d_5, d_6 \ldots d_n\}$. The first and second satellites then transmit the portion of data received at $R_1$ bits/second and the portion of data received at $R_2$ bits/second, respectively, via one or more intermediate relay satellites or directly down to the second Earth-based terminal, which reassembles the portions of data into the original data $\{d_1, d_2, d_3, d_4, d_5, d_6 \ldots d_n\}$.

Figure 1:
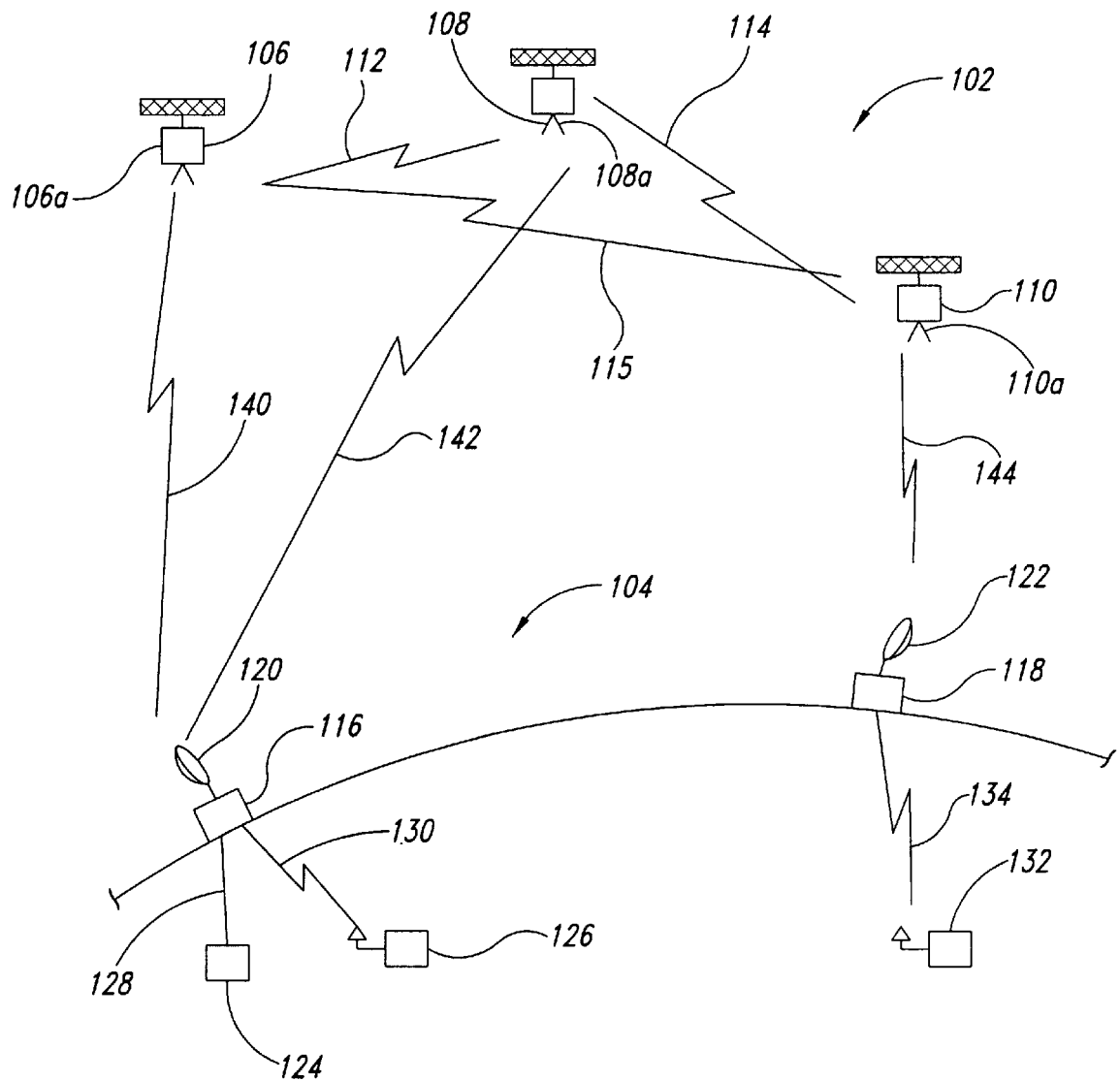
FIG. 1 is a perspective view of a portion of a non-geosynchronous satellite communication system suitable for implementing an embodiment of the present invention.

FIG. 1 illustrates a portion of a communication system 100 suitable for implementing an embodiment of the present invention. The communication system 100 includes a plurality of well known network elements capable of transmitting, buffering, switching, and receiving data. The communication system 100 preferably relies on packet-switching technology, in which data is divided into packets before transmission through the communication system 100. After being received at a first satellite, the data packets are typically routed through the satellite constellation via one or more intermediate satellites. Individual data packets that make up part of a data stream may be routed via different intermediate satellites and may therefore arrive at different times or out of sequence. If received out of order, the individual data packets must be reassembled in the proper order to reconstitute the data stream at the intended destination.

Figure 2:
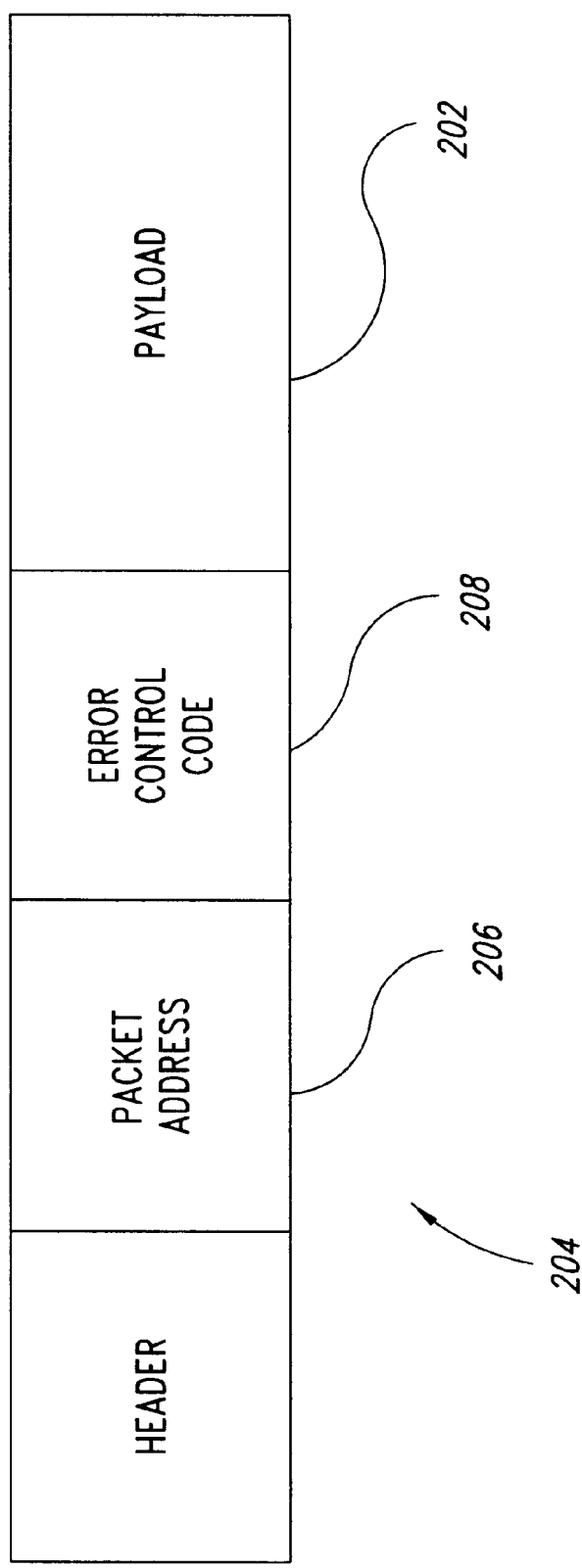
FIG. 2 illustrates a representative data packet used in the system of FIG. 1.

FIG. 2 illustrates a data packet 200 suitable for use with the present invention. The data packet 200 includes a payload 202, which typically is the data content. Those skilled in the art will appreciate that the particular content of the payload may vary according to the application and may include information needed to facilitate reassembly of the data packets into the original data stream.

The data packet 200 also includes a header 204. The header 204 includes a destination address 206, which specifies the destination satellite or Earth-based terminal to which the packet is to be routed. The data packet 200 also includes a cyclical redundancy check (CRC) 208, which is used to detect errors in the transmission of the data packet 200. As will be discussed in detail below, other forms of error detection and correction may be used in place of, or in addition to, the CRC 208.

Referring back to FIG. 1, the communication system 100 includes a satellite network 102, which in one embodiment may be a constellation of satellites in low-Earth orbit. The satellite network 102 includes a plurality of network elements to facilitate receiving, buffering, switching, and transmitting data communications. For example, the satellite network 102 may include a satellite 106, a satellite 108, and a satellite 110 that each have antennas, transmitters, receivers, and other well known circuitry to receive, decode, and route data packets to other satellites or to Earth-based terminals. Other components of the satellites 106, 108, and 110 are well known and will not be described herein.

The constellation of satellites communicate with each other using a plurality of inter satellite links. For example, data are transmitted between the satellite 106 and the satellite 108 on an inter satellite link 112 and transmitted between the satellite 108 and the satellite 110 on an inter satellite link 114. Data may also be transmitted directly from the satellite 106 to the satellite 110 on an inter satellite link 115.

The communication system 100 also may include a terrestrial network 104. The terrestrial network 104 facilitates communication among a plurality of Earth-based network elements, such as gateways, public switched telephone networks (PSTNs), local area networks (LANs), and the like, in a well known manner. For example, the terrestrial network 104 may include a plurality of Earth-based terminals, as represented by a terminal 116 and a terminal 118.

Each terminal includes circuitry to facilitate transmitting, buffering, switching, and receiving voice and data communications. For example, the terminal 116 includes an antenna 120, which can be a phased array antenna, a dish antenna, or any other suitable form of antenna. Similarly, the terminal 118 includes an antenna 122. As will be discussed below, any suitable form of satellite communications antenna will work with the communication system 100. Accordingly, the present invention is not limited by the specific form of the antenna with the terminals of the terrestrial network 104.

The terrestrial network 104 also may include a plurality of end users, such as an end user 124 and an end user 126. An "end user" refers to the entity sending and/or receiving data using the communication system 100. The end users 124 and 126 communicate with the terminal 116 using terrestrial links such as a terrestrial link 128 and a terrestrial link 130. In FIG. 1, the terrestrial link 128 is illustrated as a hard wired connection such as, by way of example, a PSTN or private network. The terrestrial link 130 is illustrated as a wireless communication link, such as, by way of example a microwave link. However, those skilled in the art can appreciate that the terrestrial links 128 and 130 may be any suitable form of communication link.

Similarly, the terminal 118 is coupled to an end user 132 by a terrestrial link 134. Although the terrestrial link 134 is illustrated as a wireless communication link, any suitable form of communication link between the terminal 118 and the end user 132 is acceptable. The present invention is not limited by the specific form of the terrestrial links.

The terrestrial network 104 also communicates with the satellite network 102. For example, the terminal 116 communicates with the satellite 106 via a network-to-network link 140. The terminal 116 communicates with the satellite 108 via a network-to-network link 14 2. The terminal 118 communicates with the satellite 110 via a network-to-network link 144. The satellites of the satellite network 102 are in low-Earth orbit and thus move quickly with respect to the terminals of the terrestrial network 104. As a result, the network-to-network links between the satellite network 102 and the terrestrial network 104 are dynamically established and broken as a particular satellite passes over a particular Earth-based terminal. As illustrated in FIG. 1, the terminal 116 is capable of communicating with the satellites 106 and 108 using the network-to-network links 140 and 142, respectively. However, when either the satellite 106 or 108 moves away from the terminal 116, the respective network-to-network link will be broken. As each satellite passes outside of communication range, other satellites (not shown) will subsequently move in their respective Earth orbits to a position where new network-to-network links may be established with the terminal 116.

Figure 3:
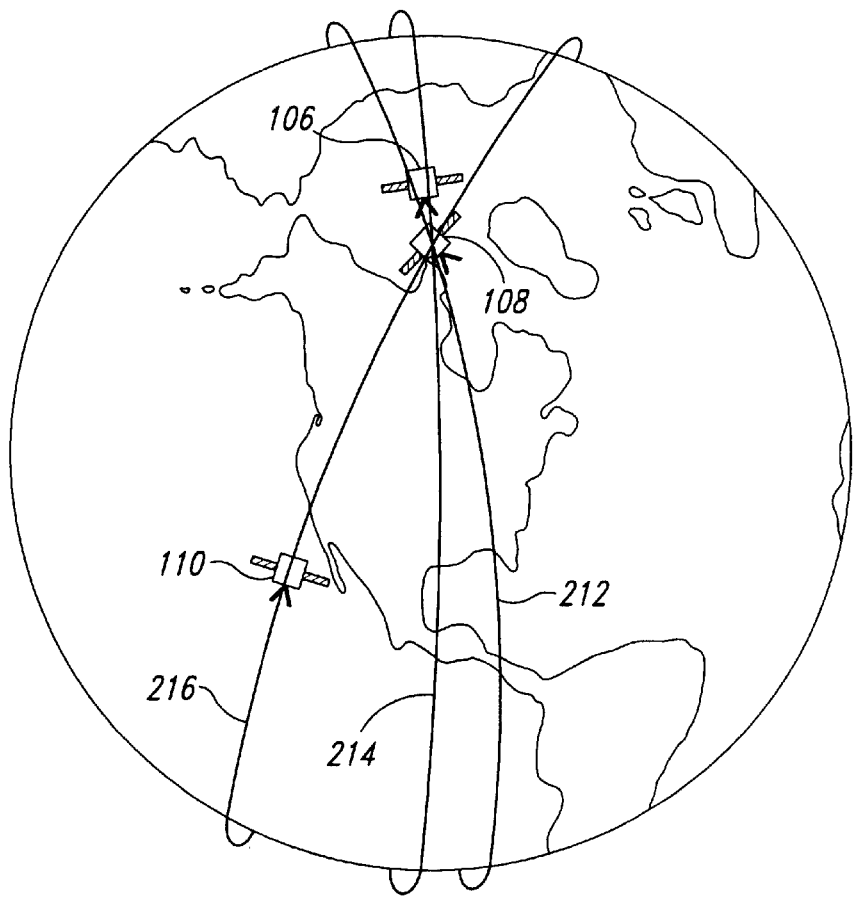
FIG. 3 illustrates the Earth and three satellites in low-Earth orbit.

Recall that the satellite network 102 in one embodiment includes a satellite constellation in non-geosynchronous orbit. In an exemplary embodiment, each satellite in the constellation has an orbital plane having an inclination of approximately ninety degrees thus creating a substantially polar constellation. FIG. 3 illustrates an orbital plane 212, an orbital plane 214, and an orbital plane 216 for the satellite 106, the satellite 108, and the satellite 110, respectively. Under certain circumstances, some satellites may be sufficiently close together that a single terminal may be capable of communicating with more than one satellite. For example, at high latitudes, the orbital planes of the satellites converge, bringing the satellites in closer proximity to one another. As will also be described in additional detail below, multiple satellites may also be located in the same or adjacent planes so that multiple satellites will be within communication range of a particular Earth-based terminal.

Figure 4:
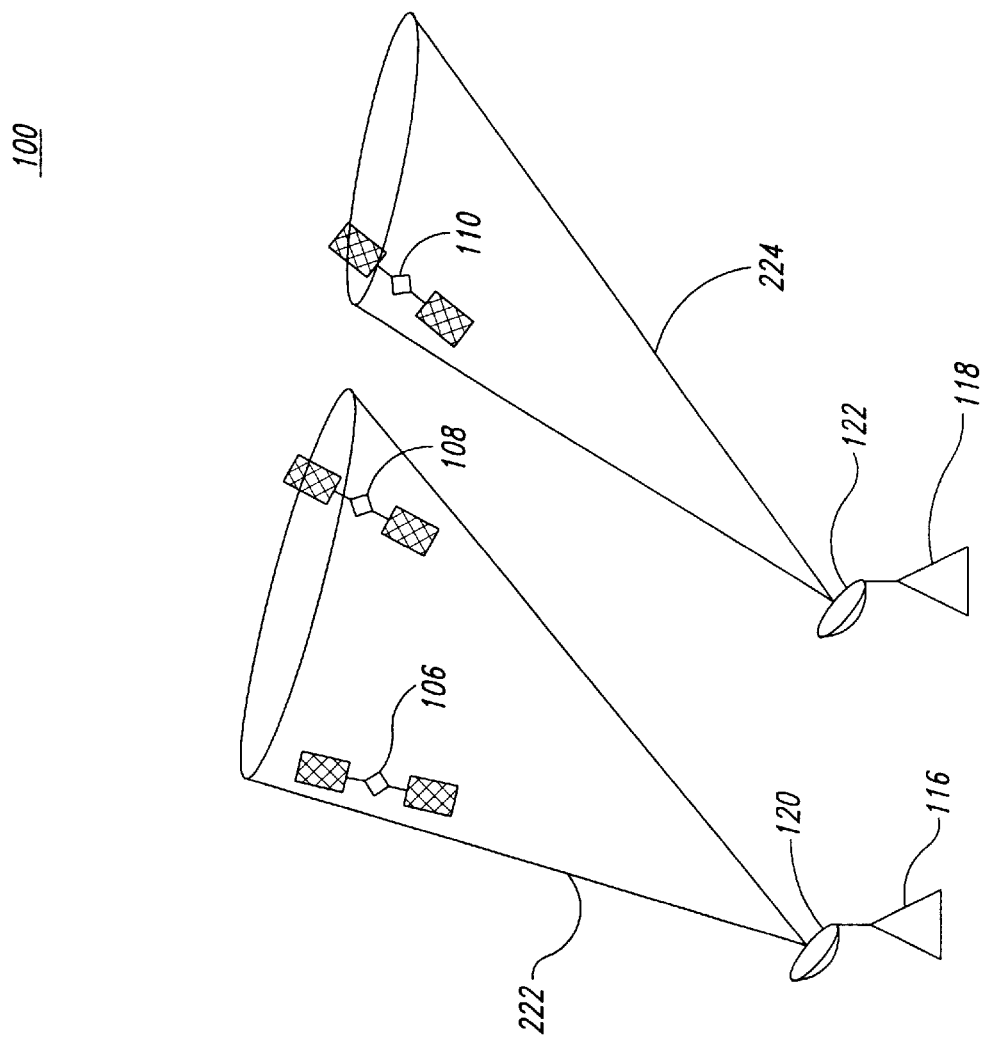
FIG. 4 illustrates antennae beam coverages of Earth-based terminal antennas.

FIG. 4 illustrates satellite positions that allow an Earth terminal to communicate with multiple satellites. The antenna 120 of the terminal 116 provides an antenna beam coverage region 222. Because the antenna beam coverage region 222 for the antenna 120 of the terminal 116 includes both the satellite 106 and the satellite 108, the satellite 106 and the satellite 108 are said to be within range of the terminal 122. The term "in range" refers to the ability of the terminal 116 to communicate with the satellites 106 and 108. In this context, "in range" is defined to include the antenna beam coverage region, which may be greater than a region defined by the beam width of the antenna 120, i.e., the angle formed between the beam center (not shown) of the antenna and the point at which the antenna gain is at one-half its maximum gain. Rather, the antenna beam coverage region 222 illustrated in FIG. 4 is intended to include any location in which the satellites 106 and 108 are within range and capable of effectively communicating with the terminal 116.

FIG. 4 also depicts an antenna beam coverage region 224 for the antenna 122 of the terminal 118. As illustrated in FIG. 4, the antenna beam coverage region 224 for the terminal antenna 122 includes only the satellite 110. Thus, only the satellite 110 is in range of the terminal 118.

Figure 5:
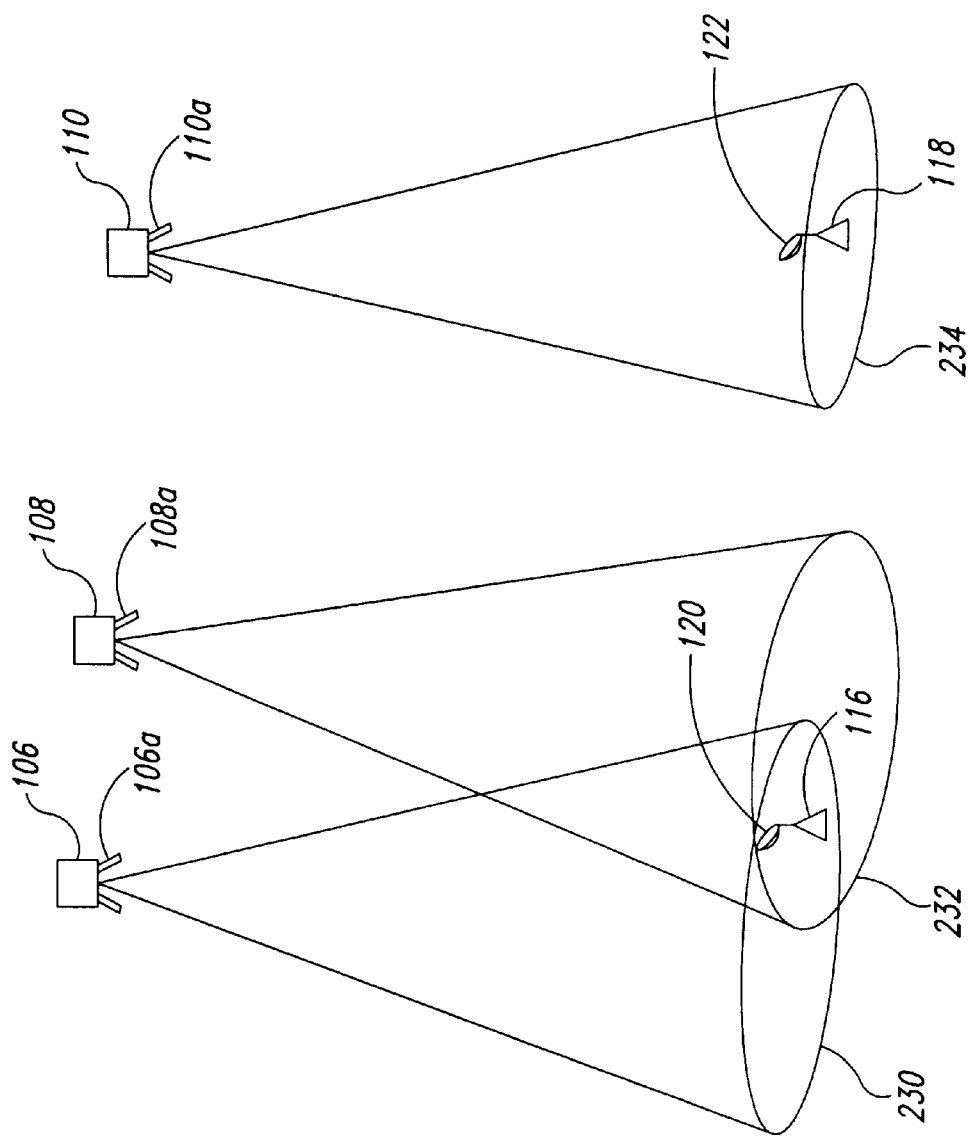
FIG. 5 illustrates antennae beam coverages of satellite antennas.

Like FIG. 4, FIG. 5 illustrates the position of two satellites that are within communication range of a single Earth-based terminal, but from the perspective of the satellite antenna coverage region. In an exemplary embodiment, the satellite antennas 106a, 108a, and 110a are designed to project a roughly circular footprint on the surface of the Earth. A terminal is considered to be in range of a satellite if the terminal is within the footprint of the satellite. In particular, FIG. 5 shows a footprint 230 for the antenna 106a of the satellite 106, a footprint 232 for the antenna 108a of the satellite 108, and a footprint 234 for the antenna 110a of the satellite 110. As illustrated in FIG. 5, the terminal 118 is only within the footprint 234 of the antenna 110a. Similarly, with reference to FIG. 4, only the satellite 110 is within the antenna beam coverage region 224 of the antenna 122. Accordingly, the terminal 118 can communicate only with the satellite 110. In contrast, both the footprint 230 of the antenna 106a and the footprint 232 of the antenna 108a simultaneously encompass the terminal 116. With reference to FIG. 4, it is noted that the satellites 106 and 108 are both simultaneously within the antenna beam coverage regions 222 of the antenna 120. Accordingly, the terminal 116 can communicate with both the satellite 106 and 108.

To illustrate the operation of the communication system 100, suppose that a financial institution, such as an investment firm dealing in stocks, has an account with a stock exchange such that the stock exchange provides real-time stock prices to the investment firm. To receive the stock quotes in real time, the investment firm must have a subscription to a high speed data communications service. For example, the stock exchange and the investment firm would be the end user 126 and the end user 132, respectively. The stock exchange (i.e., end user 126) is coupled to the terminal 116 by the terrestrial link 130 while the investment firm (i.e., end user 132) is coupled to the terminal 118 by the terrestrial link 134.

According to the illustration, the stock exchange (i.e., end user 126) transmits the stock prices as a data stream to the terminal 116 through the terrestrial link 130. The terminal 116 divides the data stream into a number of individual data packets and the antenna 120 transmits the data packets to the satellite 106 via the network-to-network link 140. The satellite 106 transmits the data packets to the satellite 110 via the inter satellite link 115. The data packets also may be transmitted from the satellite 106 to the satellite 108 via the inter satellite link 112 and then relayed from the satellite 108 to the satellite 110 via the inter satellite link 114. The data packets are transmitted from the satellite 110 to the terminal 118 via the network-to-network link 144. The terminal 118 reassembles the original data stream from the individual data packets and transmits the data stream representing the stock quotes to the investment firm (i.e., the end user 132) via the terrestrial link 134.

The satellites and terminals communicate with each other by sending data packets at a variety of data rates. The data rates at which the terminals and satellites communicate may be determined by the type of service for which a particular end user has subscribed. For example, a voice communication service may transmit at data rates between sixteen Kilobits per second (Kbps) and 32 Kbps, while other applications, such as file transfer may need up to four Megabits per second (Mbps). A high speed data communication service may transmit at data rates between four Mbps and sixty-four Mbps, or higher. Of course, those skilled in the relevant art will appreciate that a particular data rate is not required by the present invention. Instead, the present invention supports any number of data rates.

The terminal 116 must request a particular data rate for transmission of data to the satellite 106. The satellite 106 communicates with the terminal 116 and other terminals (not shown) within its footprint 230 using time division multiple access (TDMA). The terminal 116 is assigned one or more TDMA time slots based on the data rate, and communicates with the satellite 106 during the designated TDMA time slots. The number of available TDMA time slots therefore dictates the rate at which the terminal can communicate with the satellite.

The present invention is directed to a technique for allowing the terminal to transmit at a desired data rate when a particular satellite is unable to assign sufficient TDMA time slots to support that rate. In an exemplary embodiment of the present invention, the terminal 116 initially transmits a command to the satellite requesting a desired transmission rate (e.g., thirty-two Mbps) to another terminal. The request for the desired bandwidth is acknowledged by the satellite. If the acknowledgment indicates that the satellite 106 may receive data from the terminal 116 at the requested data rate (i.e., thirty-two Mbps), then the terminal divides the original data into data packets and transmits the data packets to the satellite 106 at the requested data rate (i.e., thirty-two Mbps).

Under some circumstances, the acknowledgment from the satellite 106 may indicate that the satellite is unable to assign sufficient TDMA time slots to support the requested data rate because of ongoing communications between the satellite and other terminals (not shown). For example, the satellite 106 may be unable to receive data from the terminal 116 at the requested data rate (i.e., thirty-two Mbps) because of congestion at the satellite 106. Alternatively, the satellite 106 may be able to assign sufficient TDMA time slots, but is unable to receive data at the requested data rate from the terminal 116 because the bit error rate (BER) of the transmission received from the terminal 120 is unacceptably high at the requested data rate requested by the terminal. The satellite 106 can determine the BER by measuring the number of bits in error in the initial request from the terminal 116. If the BER is unacceptable, the satellite 106 informs the terminal 116 that the channel is noisy. In another example, the satellite 106 may be able to assign sufficient TDMA time slots, but is unable to receive data at the requested data rate (i.e., thirty-two Mbps) because the satellite must reserve sufficient bandwidth to communicate with other terminals (not shown) within the footprint 232.

Under these circumstances, i.e., the inability to receive data at the requested data rate, the communication system 100 takes advantage of the fact that a plurality of satellites may be simultaneously in range of a particular terminal, and that each of the satellites can communicate at a variety of data rates. To overcome congestion at a single satellite, a terminal designed in accordance with the principles of the present invention transmits its data packets to at least two of the satellites in range of the terminal.

For example, referring to FIG. 5, when the terminal 116 is in range of both the satellites 106 and 108, and the footprints 230 and 232 encompass the terminal 116, the terminal 116 transmits a first portion of the data $\{d_1, d_2, d_3\}$ to the satellite 106 at a first data rate that is allocated by the satellite 106 and a second portion of the data $\{d_4, d_5, d_6 \ldots d_n\}$ to the satellite 108 at a second data rate that is allocated by the satellite 108. Following the example from above, assume that the terminal 116 requests to transmit data at thirty-two Mbps. The satellite 106 may allocate a data rate of thirteen Mbps, and the satellite 108 allocates nineteen Mbps. The terminal 116 transmits the first portion of the data $\{d_1, d_2, d_3\}$ to the satellite 106 at thirteen Mbps and the second portion the data $\{d_4, d_5, d_6 \ldots d_n\}$ to the satellite 108 at nineteen Mbps.

The satellite 106 then relays the first portion of the data $\{d_1, d_2, d_3\}$ to the satellite 110 via the inter satellite link 115 (see FIG. 1). The satellite 108 relays the second portion of the data $\{d_4, d_5, d_6 \ldots d_n\}$ to the satellite 110 via the inter satellite link 114. The satellite 110 relays the first and second portions of the data on the network-to-network link 144 to the terminal 118, which reassembles the portions of data into the $\{d_1, d_2, d_3, d_4, d_5, d_6 \ldots d_n\}$. Alternatively, the satellite 110 may reassemble the data portions into the data $\{d_1, d_2, d_3, d_4, d_5, d_6 \ldots d_n\}$ and transmit the reassembled data to the terminal via the network-to-network link 144.

The transmission from a single terminal to two satellites is accomplished by allocating different TDMA time slots for communicating with each of the satellites. For example, if we assume that each satellite has thirty-two possible TDMA time slots, time slots 1–3 can be assigned to the terminal 116 to allow communications with the satellite 106 at one data rate and time slots 17–23 can be assigned to the terminal 116 to allow communication with the satellite 108 at a second data rate. A resource manager (not shown) in the terminal coordinates assignment of time slots between satellites. For example, the resource manager negotiates for a channel, ie., one or more time slots at a particular frequency, with each satellite. The satellites allocates to the terminals the agreed upon channel assignments, which the resource managers accept. Terminal resource managers are well known and will not be described further herein.

It should be noted that the satellites 106 and 108 communicate with other terminals (not shown) within their respective footprints 230 and 232 during other TDMA time slots. In the example above, the satellite 106 can communicate with other terminals during its TDMA time slots 4–32 while the satellite 108 can communicate with other terminals during its TDMA time slots 1–16 and 24–32.

The antenna 120 must be capable of switching between the satellites 106 and 108 during the designated time slots. That is, the antenna must be locked on to and track the satellite 106 during the TDMA time slots 1–3 and must be locked on to and track the satellite 108 during TDMA time slots 17–23. If the antenna 120 is a phased array antenna, the antenna may be quickly switched between the satellites 106 and 108 and track the satellites using known antenna aiming techniques. If the antenna 120 is a dish antenna, it may be necessary to have more than one dish so that a separate dish is used to lock on to and track each satellite. In this embodiment, the terminal 116 switches between dishes of the antenna 120 during the assigned TDMA time slots. FIG. 4 illustrates the beam coverage region 222 as including both the satellite 106 and the satellite 108 merely to illustrate the ability of the terminal 116 to communicate with both satellites. However, those skilled in the art will recognize that the antenna 120 may have a narrow beam coverage region 222 that encompasses only one of the satellites 106 and 108 at a time and switches between the two satellites during the appropriate TDMA time slots by reaming the phased array antenna or switching between the dish antennae. Thus, the antenna 120 with a narrow beam coverage region 222 is directed only to the satellite 106 during the TDMA time slots 1–3 and is redirected only to the satellite 108 during the TDMA time slots 17–23.

Figure 6:
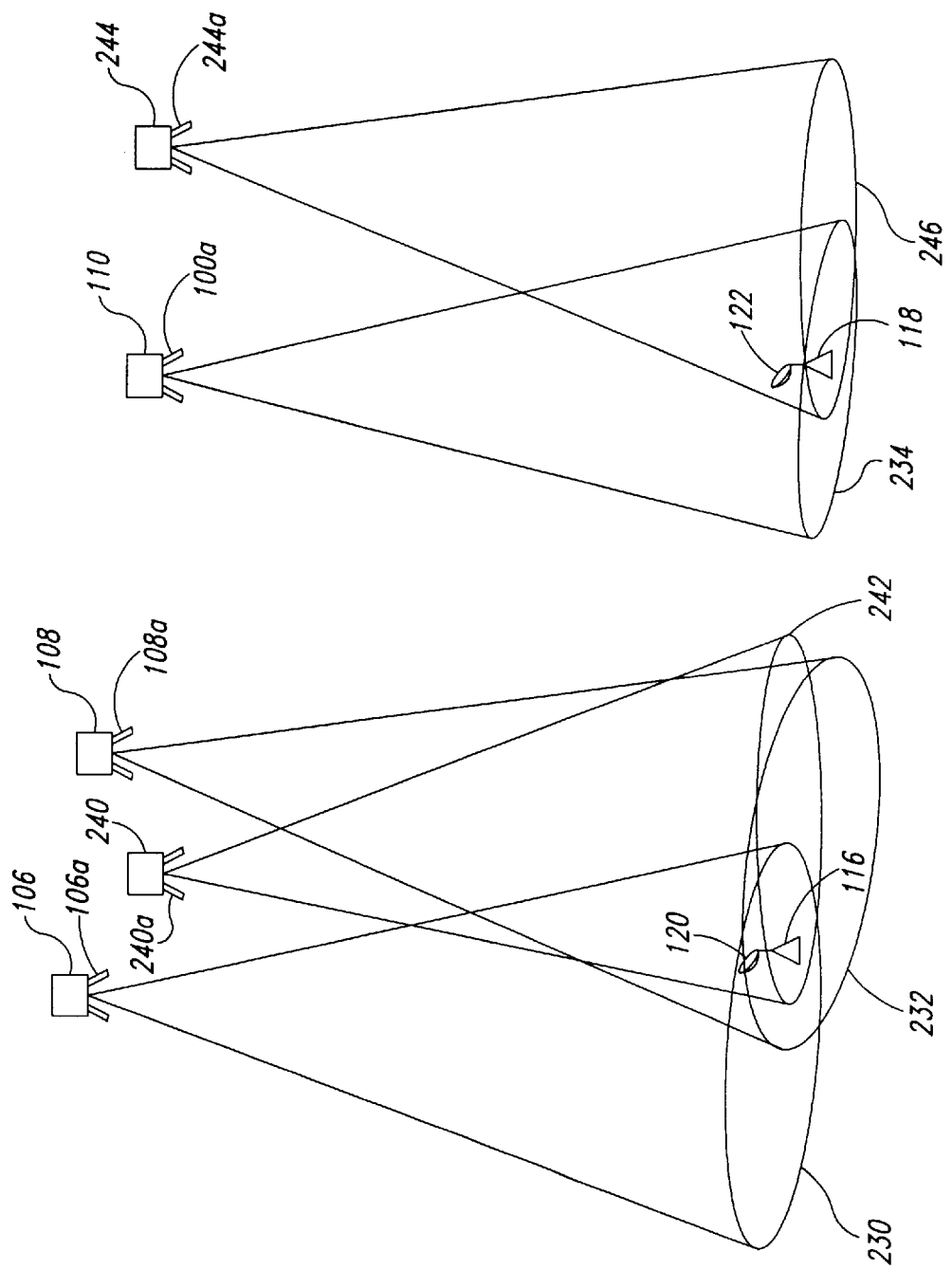
FIG. 6 illustrates Earth-based terminals capable of transmitting to or receiving from more than one satellite.

FIG. 5 illustrates the use of satellite link diversity on a satellite up-link wherein the terminal 116 transmits a first portion of the data to the satellite 106 and a second portion of the data to the satellite 108. The principles of the present invention may also be extended to three or more satellites, as illustrated in FIG. 6. An additional satellite 240 with an antenna 240a has a footprint 242 that encompasses the terminal 116. Thus, the terminal 116 is simultaneously within the footprint 230 of the antenna 106a, the footprint 232 of the antenna 108a and the footprint 242 of the antenna 240a. Assuming that the satellites 106, 108, and 240 are all within the antenna beam coverage region 222 of the terminal (see FIG. 4), the terminal 116 can communicate with all three satellites. The data $\{d_1, d_2, d_3, d_4, d_5, d_6 \ldots d_n\}$ may be apportioned among the three satellites 106, 108, and 240 proportional to accommodate the data rates allocated by each of the satellites.

The data rates selected for transmission to the satellites 106, 108, and 240, respectively, preferably sum to equal the data rate initially requested by the terminal 116. In the example presented above, the terminal 116 requested a data rate of thirty-two Mbps. As each satellite responds to the terminal's request for bandwidth, the terminal continues to request bandwidth from additional satellites, until the total data rate for communications equals the requested data rate of thirty-two Mbps. During the bandwidth request process, it will be appreciated that the communications system 100 only may accommodate a data transfer rate that is less than that initially requested. For example, the data rate that is supported by the three satellites 106, 108, and 240 may be less than the requested data rate. In such an event, the terminal 116 must accept the lesser rate if the lesser rate will still provide an acceptable transmission rate for the particular data being transmitted. It will be appreciated that even though the requested data rate might not be met by the three satellites, the communication system 100 still permits greater transfer rates than can be achieved using only one satellite. Thus, link diversity of the communication system 100 maximizes the data transfer between the terrestrial network 104 (see FIG. 1) and the satellite network 102.

Preferably, a single satellite will support the entire bandwidth necessary to deliver the data to the terminal 118. That is, either the satellite 110 or the satellite 244 can transmit the data to the terminal 118. If a single satellite cannot allocate sufficient bandwidth, however, satellite link diversity can also be implemented on a down-link from the satellite network 102 to the terrestrial network 104. FIG. 6 depicts a satellite 244 with an antenna 244a that generates a footprint 246. The terminal 118 is simultaneously within the footprint 234 of the antenna 110a and the footprint 246 from the antenna 244a. Assuming that both satellites 110 and 244 are within the antenna beam coverage region 224 (see FIG. 4) of the antenna 122, the terminal 118 can communicate with both satellites. The data may be split and transmitted from the satellites 110 and 244 to the terminal 118. The down-link negotiation process would be similar to the up-link negotiation process.

Recall that each terminal requests a channel (i.e., one or more time slots at a particular frequency) able to support an R bits/second data rate on the up-link. Using satellite link diversity, the terminal would transmit to the first satellite at $R_1$ bits/second and to the second satellite at $R_2$ bits/second.

On the down-link the first satellite can transmit to the terminal at R bits/second. Alternatively, the first satellite can transmit to the terminal at $R_1$ bits/second and the second satellite can transmit to the terminal at $R_2$ bits/second or at other allocated data rates such that the sum of the allocated data rates is preferably equal to or greater than the requested data rate. Alternatively still, the second satellite can transmit to the terminal at R bits/second. The satellite link diversity on the up-link and the down-link advantageously relieves data congestion at individual satellites, resulting in greater data rates than is possible by sending and receiving data through a single satellite.

It will also be appreciated that communication with multiple satellites rather than a single satellite also improves the overall BER of the communication path. It should be noted that when the terminal 116 communicates with the satellite 106 via a network-to-network link 144, the transmitting, buffering, switching, and receiving of data communications introduces noise into the signals carrying data. The noise may be propagated throughout the communication system 100. Noise in the communication system 100 is typically characterized in terms of the BER which may be specified in terms of the number of erroneous data bits per number of total data bits. As the noise in the communication network 100 increases, the BER in the communication network 100 increases. As previously discussed, the CRC 208 (see FIG. 2) is used to detect errors in the transmission of each data packet 200. However, it is also possible to encode the data $\{d_1, d_2, d_3, d_4, d_5, d_6, \ldots d_n\}$ in a manner that permits error detection and correction.

Figure 7:
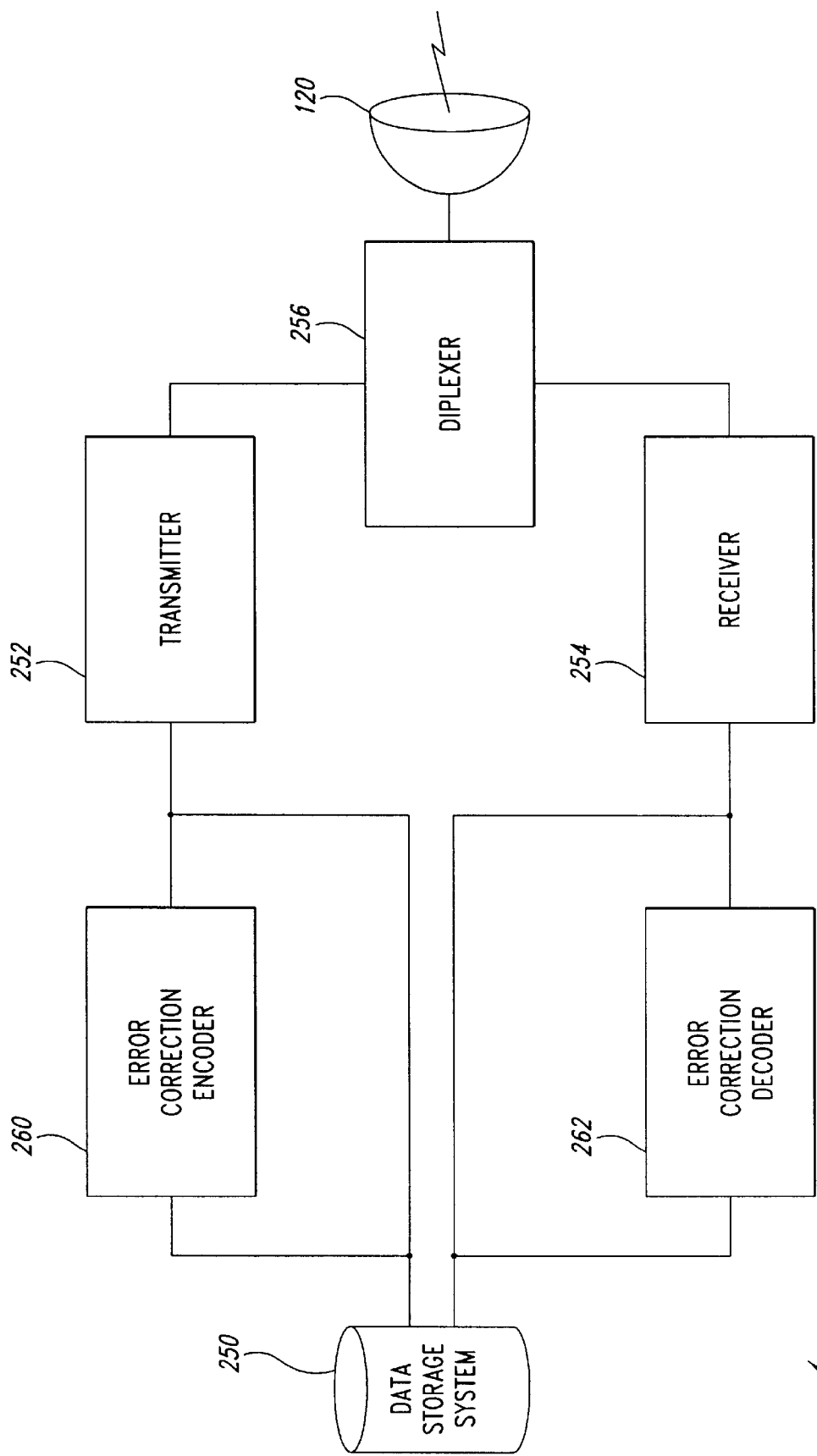
FIG. 7 illustrates a functional block diagram of one embodiment of an Earth-based terminal utilizing an error correction encoder and decoder.

FIG. 7 illustrates a functional block diagram of one embodiment of a terminal capable of error detection and correction. For the sake of clarity, FIG. 7 illustrates only a portion of the components of the terminal 116. However, it should be understood that similar components are required in the terminal 118 to enable two-way communication between the terminals using error detection and correction. The terminal 116 includes a data storage device 250 that stores the original data $\{d_1, d_2, d_3, d_4, d_5, d_6 \ldots d_n\}$. The data storage device 250 may include a data buffer, a computer memory, a hard disk drive, a magnetic tape drive, or any other data storage system suitable for storing data prior to transmission through the communication system 100.

The terminal 120 also includes a transmitter 252 that transmits, for example, the first portion of the data $\{d_1, d_2, d_3\}$, the second portion of the data $\{d_4, d_5\}$, and the third portion of the data $\{d_6 \ldots d_n\}$ to the satellites 106 (see FIG. 6), 108, and 240 respectively, on the up-link. The specific form of transmitter 252 is not essential to the present invention, and, because implementation of the transmitter 252 is well known, will not be described further herein.

The terminal 116 also includes a receiver 254 that receives data from the satellites. One type of data received by the terminal 116 is a reply to the requests for a communication link at a requested data rate (e.g., thirty-two Mpbs). The terminal 116 also receives data transmitted from other terminals. The specific form of the receiver 254 is not essential to the present invention, and implementation of the receiver 254 is well known.

The terminal 116 also may include a diplexer 256 or any suitable antenna splitter/combiner system that allows the antenna 120 to be used with both the transmitter 252 and the receiver 254.

Terminal 116 includes an error correction encoder 260 that encodes the original data $\{d_1, d_2, d_3, d_4, d_5, d_6, \ldots d_n\}$ to generate error correction encoded data $\{c_1, c_2, c_3, c_4, c_5,$ $c_6, \ldots c_m\}$. In a conventional error correction encoding system, sometimes referred to as forward error correction (FEC), the various data bits of the original data $\{d_1, d_2, d_3, d_4, d_5, d_6, \ldots d_n\}$ are linearly combined in a predetermined fashion to generate the error correction encoded data $\{c_1, c_2, c_3, c_4, c_5, c_6, \ldots c_m\}$ where m>n. The terminal 116 transmits data packets containing the error correction encoded data through the satellite constellation by transmitting portions of the error correction encoded data packets to two or more satellites in range of the terminal, as described above.

An error correction decoder 262 in the receiving terminal 118 decodes error correction encoded data $\{c_1, c_2, c_3, c_4, c_5, c_6 \ldots c_m\}$ and recovers data $\{d_1, d_2, d_3, d_4, d_5, d_6 \ldots d_n\}$. Because error correction encoded data $\{c_1, c_2, c_3, c_4, c_5, c_6 \ldots c_m\}$ are a function of the original data $\{d_1, d_2, d_3, d_4, d_5, d_6 \ldots d_n\}$, under some circumstances, the original data $\{d_1, d_2, d_3, d_4, d_5, d_6 \ldots d_n\}$ may be determined by processing only a portion of error correction encoded data $\{c_1, c_2, c_3, c_4, c_5, c_6 \ldots c_m\}$.

Figure 8:
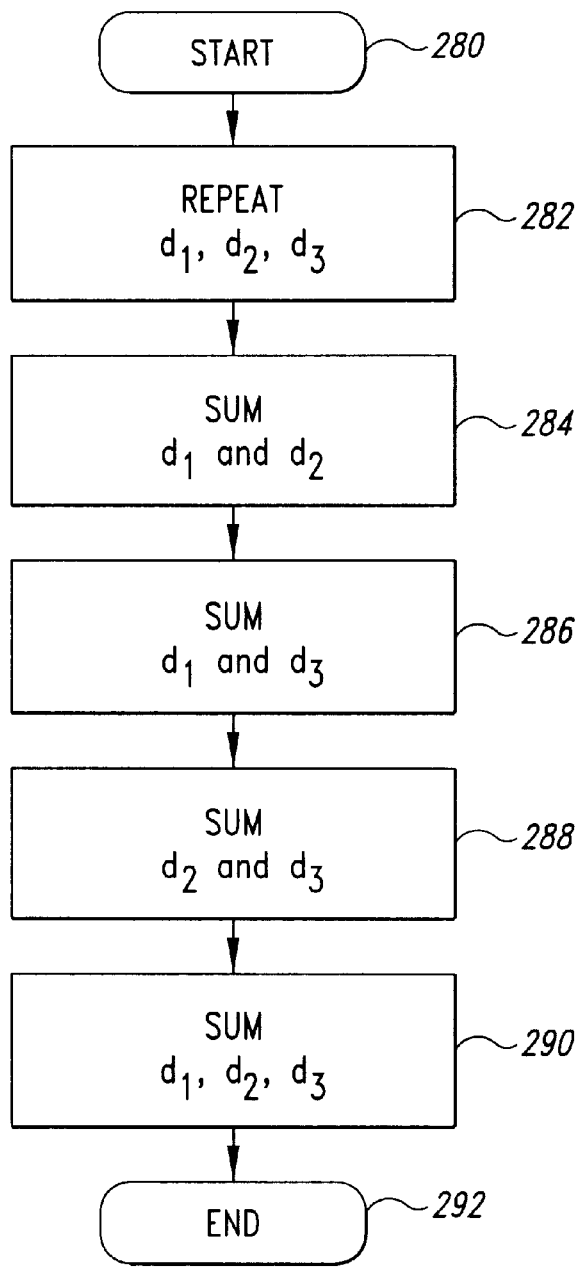
FIG. 8 is a flowchart illustrating an error correction encoding process used by the encoder of FIG. 7 to encode data.

FIG. 8 is a flowchart illustrating a simple example of an error encoding process that may be used by the error correction encoder 260 to map three bits of data $\{d_1, d_2, d_3\}$, into seven bits of error correction encoded data $\{c_1, c_2, c_3, c_4, c_5, c_6, c_7\}$ that are suitable for use in one embodiment of the present invention. To illustrate a sample encoding process, suppose that $d_1=1$, $d_2=1$, and $d_3=0$. The error correction encoding process starts at 280, where control immediately passes to task 282.

Task 282 assigns the values as the first three bits in the error correction encoded data series $\{c_1, c_2, c_3\}$ to the value of bits $d_1, d_2, d_3$; i.e., $c_1=d_1$; $c_2=d_2$; $c_3=d_3$. Task 284 sums the data bits $d_1$, and $d_2$, (ie., 1+1=10) and writes the least significant bit as the fourth bit $C_4=0$ in the error correction encoded data series $\{c_1, c_2, c_3, c_4\}$. The error correction encoded data is now $\{1, 1, 0, 0\}$. Task 286 sums the data bits $d_1$ and $d_3$ (i.e., 1+0=01), and writes the least significant bit as the fifth bit $c_5=1$ in the error correction encoded data series $\{c_1, c_2, c_3, c_4, c_5\}$. The error correction encoded data is now $\{1, 1, 0, 0, 1\}$. Task 288 sums $d_2$ and $d_3$ (i.e., 1+0=01), and writes the least significant bit as the sixth bit $c_6=1$ in the error correction encoded data series $\{c_1, c_2, c_3, c_4, c_5, c_6\}$. The error correction encoded data is now $\{1, 1, 0, 0, 1, 1\}$. Task 290 sums the data bits $d_1$ and $d_2$ and $d_3$ (i.e., 1+1+0=10), and writes the least significant bit as the seventh bit $c_7=0$ in the error correction encoded data series $\{c_1, c_2, c_3, c_4, c_5, c_6, c_7\}$. The error correction encoded data is now $\{1, 1, 0, 0, 1, 1, 0\}$. The error correction encoding process ends at 292. Thus, the original data bits $\{d_1, d_2, d_3\}$ are now represented by a series of seven error correction encoded data bits $\{c_1, c_2, c_3, c_4, c_5, c_6, c_7\}$. This process is repeated to encode all data that is to be transmitted through the satellite network.

In accordance with the principles of the present invention, the transmitter system 252 (see FIG. 7) transmits a first portion of the error correction encoded data to one satellite and a second portion of the error corrected encoded data to a second satellite. Alternatively, the overall BER may be improved if the first portion of the data transmitted to the first satellite is the original data (e.g., $\{c_1, c_2, c_3\}$), and the second portion of the data transmitted to the second satellite is the error correction encoded data (e.g., $\{c_4, c_5, c_6, c_7\}$). By transmitting the original data bits separately from the error correction encoded data bits, the overall BER is improved because a failure or interference in one of the satellite up-links can be corrected using the data received on the other satellite up-link.

Figure 9:
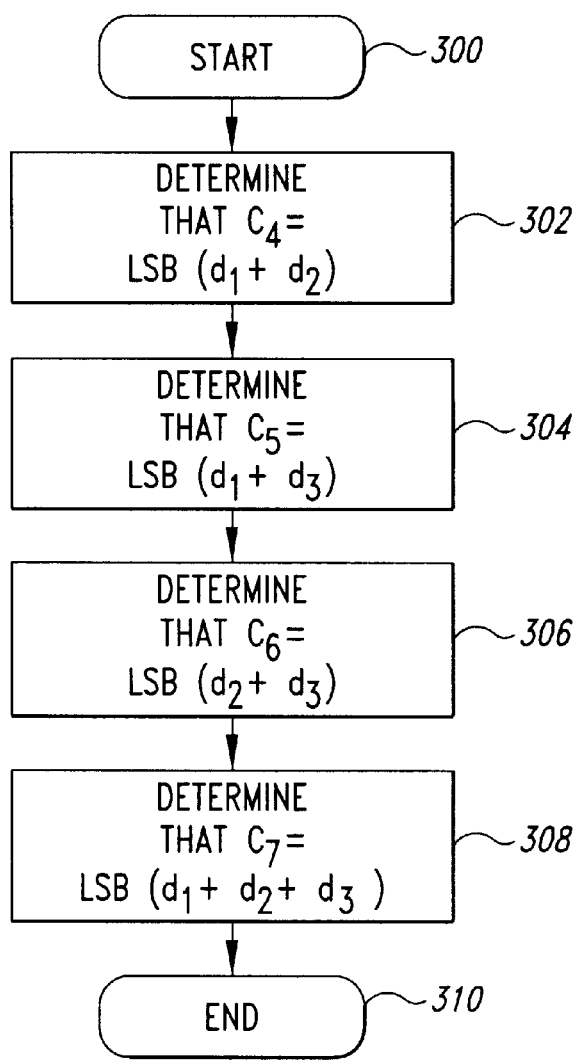
FIG. 9 is a flowchart illustrating an error correction decoding process used by the decoder of FIG. 7 to recover data.

FIG. 9 depicts a flowchart of an error correction decoding process whereby only the portion of the error correction encoded data comprised of the error correction bits is received by the receiver system 254 (see FIG. 7). For example, as depicted in FIG. 5, satellite 106 may receive the portion of error correction data comprising the FEC data bits $\{c_1, c_2, c_3,\}$ and satellite 108 may receive the portion of error correction data bits comprising the FEC data bits $\{c_4, c_5, c_6, c_7\}$. All error correction encoded data is relayed to the satellite 110 by the satellites 106 and 108. The error correction encoded data is transmitted from the satellite 110 to the terminal 118. If a substantial error was introduced in the up-link between the terminal 116 and the satellite 106, the terminal may only receive the four bits of error correction encoded data $\{c_4, c_5, c_6, c_7\}$. FIG. 9 illustrates an an error correction decoding process whereby the original data $\{d_1, d_2, d_3\}$ are still able to be recovered.

It should be noted that the error encoding process is predetermined and thus is known by the error correction decoder 262 (see FIG. 7). The error correction decoding process starts at 300, where control immediately passes to task 302. Task 302 determines that the error correction encoded data bit $\{c_4\}$ was generated by summing the data bits $d_1$ and $d_2$, and writing the least significant bit to generate $\{0\}$. Two possible combinations for the data bits $\{d_1, d_2\}$ yield this result. The combination $\{d_1=0, d_2=0\}$ and $\{d_1=1, d_2=1\}$ yield this result. The error correction decoder 262 must determine which combination of data bits is correct based on the additional error correction encoded data bits $\{c_5, c_6, c_7\}$.

Task 304 determines that $\{c_5\}$ was generated by summing the data bits $d_2$ and $d_3$ and writing the least significant bit to generate $\{1\}$. If $\{d_1=0, d_2=0\}$ as a result of task 302, then $\{d_3=1\}$ in task 304. However, if $\{d_1=1, d_2=1\}$ as a result of task 302, then $\{d_3=0\}$ in task 304. Similarly, task 306 determines that $\{c_6\}$ was generated by summing the data bits $d_2$ and $d_3$, and writing the least significant bit to generate $\{1\}$. If $\{d_1=0, d_2=0\}$ as a result of task 302 , then $\{d_3=1\}$ in task 306. However, if $\{d_1=1, d_2=1\}$ as a result of task 302, then $\{d_3=0\}$ in task 306.

In task 308, the error correction decoder 262 (see FIG. 7) in the terminal 118 determines that $\{c_7\}$ was generated by summing the data bits $d_1$, $d_2$, and $d_3$, and writing the least significant bit to generate $\{0\}$. The only possible data combinations that result in $\{c_7=0\}$ is $\{d_1=1, d_2=1, d_3=0\}$. Thus, the error correction decoder 262 can recover the original data bits $\{d_1, d_2, d_3\}$ by processing only a portion of the transmitted error correction encoded data bits $\{c_1, c_2, c_3, c_4, c_5, c_6, c_7\}$. The ability to recover the original data bits depends, of course, on receiving the FEC data bits without error.

As noted above, the overall BER is reduced when the terminal 116 (see FIG. 1) transmits a first portion of the error correction encoded data comprising the FEC data bits $\{c_1, c_2, c_3\}$ at ten Mbps to the satellite 106, and transmits a second portion the error correction encoded data comprising the FEC data bits $\{c_4, c_5, c_6, c_7\}$ at twenty-two Mbps to the satellite 108. The BER is reduced because the data $\{d_1, d_2, d_3\}$ can be recovered if there is a failure (or error) in the transmission between the terminal 116 and the satellite 106 via the network-to-network link 140, or between the satellite 106 and the satellite 110 via the inter satellite link 115, or between the satellite 110 and the terminal 118 via the network-to-network link 144. Similarly, the data $\{d_1, d_2, d_3\}$ can be recovered if there is a failure (or error) in the transmission between the terminal 116 and the satellite 108 via the network-to-network link 142, or between the satellite 108 and the satellite 110 via the inter satellite link 114, or between the satellite 110 and the terminal 118 via the network-to-network link 144.

Those skilled in the art can appreciate that the present invention may be implemented using hardware, software, or a combination thereof, and may be implemented using a computer system or other processing system. As such, the present invention contemplates communications controllers capable of carrying out the functionality described herein.

Those skilled in the art will also appreciate that the present invention relies on a ground terminal being able to communicate with two or more satellites that are simultaneously "in range" of the terminal. The ability to communicate with two or more satellites may arise in a variety of different satellite constellations. For example, if the constellation of satellites are in near polar orbits, the probability of a terminal being able to communicate with multiple satellites increases as the terminal is moved away from the equator and toward the poles. Alternatively, a constellation of satellites may also be expanded by adding additional satellites so that two or more satellites will always be in range of a given ground terminal. The satellite diversity technique disclosed herein therefore has broad applicability to a variety of satellite constellations.

From the foregoing it will be appreciated that, although specific embodiments of the invention have been described herein for purposes of illustration, various modifications may be made without deviating from the spirit and scope of the invention. For example, the principles of the present invention are applicable to any form of the satellites 106, 108, 110, 240 and 244 (see FIG. 6). In addition, the principles of the present invention are applicable to any non-geostationary (non-GSO) satellite system, such as a medium Earth orbit system, where satellite coverage of a particular location on the Earth is intermittent. Accordingly, the present invention is not limited except as by the appended claims.

What is claimed is:

1. A satellite communication system comprising:
   an Earth-based terminal capable of communicating with satellites at a first data rate;
   first and second satellites in non-geosynchronous Earth orbits and passing simultaneously within communication range of the first Earth-based terminal, the first and second satellites capable of communicating with the Earth-based terminal at a data rate at least equal to the first data rate; and
   a communication controller within first Earth-based terminal, the communication controller transmitting a communication allocation request to the first satellite to request a communication link with the first satellite at the first data rate and receiving a response from the first satellite indicative of an available data rate, the Earth-based terminal transmitting data to the first satellite at the available data rate, and if the available data rate is less than the first data rate, the communication controller transmitting a communication allocation request to the second satellite to request a communication link with the second satellite at a second data rate and receiving a response from the second satellite indicative of a second available data rate, the Earth-based terminal transmitting a first portion of the data to the first satellite at the first available data rate and transmitting a second portion of the data, different from the first portion, to the second satellite at the second available data rate.

2. The system of claim 1 wherein the first and second satellites process the first and second data portions to recover the data in one of the first and second satellites.

3. The system of claim 1, further comprising a second Earth-based terminal designated as a recipient of the data transmitted from the first Earth-based terminal.

4. The system of claim 3, further comprising a communication controller in the second Earth-based terminal to process the first and second data portions and thereby recover the data.

5. The system of claim 3 wherein the first and second satellites process the first and second data portions to recover the data in a selected one of the first and second satellites and the selected one of the first and second satellites transmits the recovered data to the second Earth-based terminal.

6. The system of claim 3, further comprising a third satellite in non-geosynchronous Earth orbit and passing within communication range of the second Earth-based terminal wherein the first and second satellites relay the first and second data portions to the third satellite, the third satellite processing the first and second data portions to thereby recover the data and transmitting the recovered data to the second Earth-based terminal.

7. The system of claim 3, firther comprising a third satellite in non-geosynchronous Earth orbit and passing within communication range of the second Earth-based terminal wherein the first and second satellites relay the first and second data portions to the third satellite, the third satellite transmitting the first and second data portions to the second Earth-based terminal.

8. The system of claim 1, further comprising an error correction encoder in the Earth-based terminal to process the data and thereby generate encoded data, wherein the first and second portions of the data are error correction encoded data.

9. The system of claim 8, further comprising:
   a second Earth-based terminal designated as a recipient of the error correction encoded data; and
   an error correction decoder in the second Earth-based terminal to process the first and second error correction encoded data portions to recover the data.

10. An Earth-based terminal for transmitting to a plurality of satellites in non-geosynchronous Earth orbits, comprising:
    an antenna system to communicate with a first and second satellite in the plurality of satellites;
    a transmitter in the first Earth-based terminal and coupled to the antenna system to transmit to the first and second satellites, the transmitter transmitting a request for a communication link with the first satellite at a first data rate;
    a receiver in the first Earth-based terminal and coupled to the antenna system to receive from the first and second satellites, the receiver receiving a reply from the first satellite indicating an available data rate in response to the request for a communication link; and
    a communication processor, in response to the reply from the first satellite, establishing a communication link with the first satellite if the available data rate is greater than or equals the first data rate, or, if the available data rate is less than the first data rate, apportioning the data into first and second different data portions, the transmitter establishing a first communication link with the first satellite to transmit the first data portion to the first satellite at the first available data rate and, while maintaining the first communication link, establishing a second communication link with the second satellite to transmit the second data portion to the second satellite at a third data rate less than the first data rate.

11. The Earth-based terminal of claim 10, further comprising an error correction encoder to process the data and thereby generate encoded data, wherein the first and second data portions comprise encoded data.

12. The Earth-based terminal of claim 10 wherein the first satellite has a current maximum data rate less than the first data rate, and the transmitter transmits at the second data rate selected to be less than the current maximum data rate.

13. The Earth-based terminal of claim 10 wherein the first satellite has a current maximum data rate greater than the first data rate, and the transmitter transmits at the second data rare selected to be less than the current maximum data rate by a predetermined amount.

14. The Earth-based terminal of claim 10 wherein the communication controller apportions the data into first, second, and third different data portions and the transmitter, while maintaining the first and second communication links, establishes a third communication link with a third satellite in the plurality of satellites to transmit the third data portion to the third satellite at a fourth data rate less than the first data rate.

15. A method for transmitting data from an Earth-baed terminal to a plurality of satellites in non-geostationary Earth orbits, the method comprising the steps of:
   requesting a commmunication link with a first satellite at a requested data rate;
   establishing a first satellite communication link with the first satellite to communicate with the first satellite at a first data rate less than the requested data rate;
   requesting a communication link with a second satellite at a second data rate;
   while maintaining the first communication link, establishing the second communication link with the second satellite to communicate with the second satellite at the second data rate;
   transmitting a first portion of the data to the first satellite at the first data rate; and
   while maintaining the first communication link, tansmitting a second portion of the data to the second satellite at the second data rate, the second portion of the data being different from the first portion of the data.

16. The method of claim 15, further comprising the step of processing the first and second portions to recover the data.

17. The method of claim 15, firther comprising the step of encoding the data prior to transmission.

18. The method of claim 17 wherein the step of transmitting the first portion transmits a first portion of the encoded data and the step of transmitting the second portion transmits a second portion of the encoded data, the second encoded data portion being different from the first encoded data portion.

19. The method of claim 18, further comprising the step of processing the first and second encoded data portions to recover the encoded data.

20. The method of claim 15 wherein the first satellite has a current maximum data rate and the step of transmitting the first portion transmits at a first data rate less than the current maximum data rate of the first satellite and the step of transmitting the second portion transmits at a second data rate less than the current maximum data rate of the first satellite.

21. The method of claim 15, further comprising the steps of:
   while maintaining the first and second communication links, establishing a third communication link with a third satellite to communicate with the third satellite; and
   transmitting a third portion of the data to the third satellite, the third portion of the data being different from the first and second portions of the data.

* * * * *